US009036086B2

(12) United States Patent
Hung

(10) Patent No.: US 9,036,086 B2
(45) Date of Patent: May 19, 2015

(54) DISPLAY DEVICE ILLUMINATION

(71) Applicant: Konica Minolta Laboratory U.S.A., Inc., San Mateo, CA (US)

(72) Inventor: Po-Chieh Hung, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/229,204

(22) Filed: Mar. 28, 2014

(65) Prior Publication Data

US 2014/0293134 A1    Oct. 2, 2014

Related U.S. Application Data

(60) Provisional application No. 61/806,656, filed on Mar. 29, 2013.

(51) Int. Cl.
*H04N 5/00* (2011.01)
*H04N 5/205* (2006.01)
*H04N 9/73* (2006.01)

(52) U.S. Cl.
CPC . *H04N 5/205* (2013.01); *H04N 9/73* (2013.01)

(58) Field of Classification Search
USPC .......... 348/624, 552, 553, 725, 607; 345/596, 345/589, 597; 382/164
See application file for complete search history.

(56) References Cited

U.S. PATENT DOCUMENTS

| 4,903,121 | A * | 2/1990 | Uomori et al. ................ 348/242 |
| 5,271,096 | A * | 12/1993 | Cook ............................. 345/604 |
| 7,969,479 | B2 * | 6/2011 | Noh et al. .................. 348/223.1 |
| 8,508,625 | B2 * | 8/2013 | Hirai ............................. 348/234 |
| 8,629,827 | B2 * | 1/2014 | Lee et al. ...................... 345/100 |
| 8,659,512 | B2 * | 2/2014 | Hae-Yeon et al. ............. 345/76 |
| 8,711,173 | B2 * | 4/2014 | Bratt et al. .................... 345/596 |
| 8,760,604 | B2 * | 6/2014 | Sawaki et al. .................. 349/97 |
| 2005/0243175 | A1 * | 11/2005 | Yamada et al. ............ 348/207.1 |
| 2006/0262226 | A1 * | 11/2006 | Odryna et al. ................ 348/646 |
| 2009/0184904 | A1 | 7/2009 | S. et al. |
| 2009/0263013 | A1 * | 10/2009 | Xiong et al. .................. 382/164 |
| 2013/0329098 | A1 * | 12/2013 | Lim et al. ...................... 348/246 |

OTHER PUBLICATIONS

Brightline, LP, "Basic Principles of Video Conferencing Lighting," Oct. 2002 (5 pages).
John Haney Software, "Flashlight," printed on Mar. 26, 2013 (3 pages).

* cited by examiner

*Primary Examiner* — Paulos M Natnael
(74) *Attorney, Agent, or Firm* — Osha • Liang LLP

(57) ABSTRACT

A method for displaying a main image includes: populating a plurality of image entries in a video frame based on the main image; selecting an image entry specifying a first color; determining a compensation entry of a plurality of compensation entries in the video frame associated with the image entry; selecting a second color based on the first color; setting the compensation entry to the second color; and outputting the video frame with the image entry and the compensation entry for display on a display device.

22 Claims, 7 Drawing Sheets

DISPLAY DEVICE ILLUMINATION

CROSS-REFERENCE TO RELATED APPLICATIONS

This application is a non-provisional patent application of U.S. Provisional Patent Application Ser. No. 61/806,656, filed on Mar. 29, 2013, and entitled: "Display Device Illumination." Accordingly, this non-provisional patent application claims priority to U.S. Provisional Patent Application Ser. No. 61/806,656 under 35 U.S.C. §119(e). U.S. Provisional Patent Application Ser. No. 61/806,656 is hereby incorporated in its entirety.

BACKGROUND

During video conferencing a dark room is often used and as a result, the main source of illumination is the display device that is actually being used for the teleconference. However, the light emitted from the display is usually not well suited for color reproduction because it may be dramatically different from the ambient light that the party taking part in the video conference is exposed to. As a result, the color of objects, e.g., the user's face, as seen by a second party will not be representative of the color of objects when illuminated by ambient light at the first party's location. For example, if a first party is taking part in a teleconference where a second party's image being displayed is dominated by red light, the light that is primarily illuminating the first party from the display will also be primarily red. This will lead to all objects in the scene being displayed to a second party to take on a reddish hue. Also, even if a scene is neutral in color, displays are typically adjusted to output bluish white colored light which causes displayed images to take on a bluish white hue which does not represent the scene.

SUMMARY

In general, in one aspect, the invention relates to a method for displaying a main image. The method comprises: populating a plurality of image entries in a video frame based on the main image; selecting an image entry specifying a first color; determining a compensation entry of a plurality of compensation entries in the video frame associated with the image entry; selecting a second color based on the first color; setting the compensation entry to the second color; and outputting the video frame comprising the image entry and the compensation entry for display on a display device.

In general, in one aspect, the invention relates to a method for displaying a main image on a display device. The method comprises: setting an image pixel of the display device to a first color based on the main image; and setting a compensation pixel of the display device corresponding to the image pixel to a second color based on an opponent color associated with the first color.

In general, in one aspect, the invention relates to a non-transitory computer readable medium (CRM) storing instructions for displaying a main image. The instructions comprise functionality for: populating a plurality of image entries in a video frame based on the main image; selecting an image entry specifying a first color; determining a compensation entry of a plurality of compensation entries in the video frame associated with the image entry; selecting a second color based on the first color; setting the compensation entry to the second color; and outputting the video frame comprising the image entry and the compensation entry for display on a display device.

In general, in one aspect, the invention relates to an apparatus for displaying a main image. The apparatus comprises: a video frame comprising a plurality of image entries and a plurality of compensation entries; a controller configured to: populate the plurality of image entries based on the main image; select an image entry specifying a first color; determine a compensation entry associated with the image entry; select a second color based on the first color; and set the compensation entry to the second color; and a display device that sets a plurality of image pixels based on the plurality of image entries and sets a plurality of compensation pixels based on the plurality of compensation entries.

In general, in one aspect, the invention relates to a display device for displaying a main image. The display device comprises: an image pixel comprising a first color based on the main image; and a compensation pixel corresponding to the image pixel and comprising a second color based on an opponent color associated with the first color.

Other aspects and advantages of the disclosure will be apparent from the following description and the appended claims.

DETAILED DESCRIPTION

Figure 1:
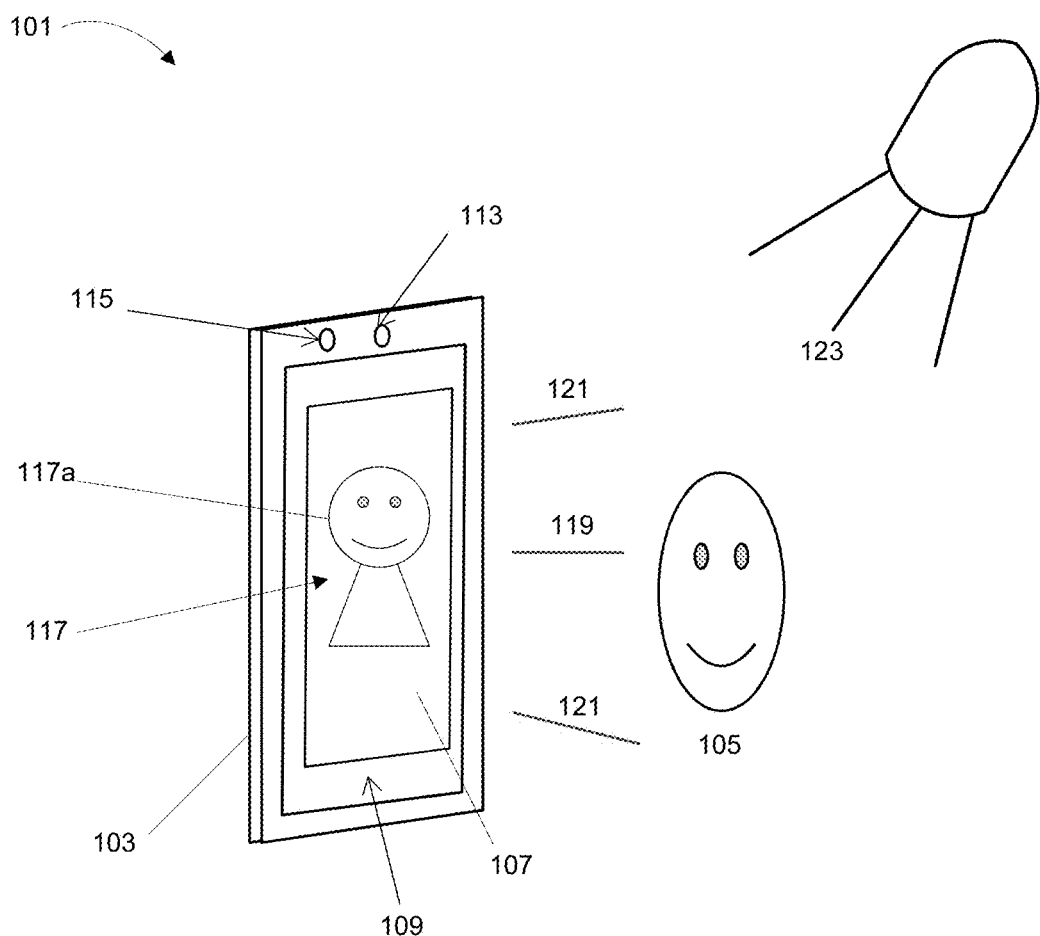
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention include a system having a display and a camera. A subject (e.g., one or more people, animal(s), object(s), etc.) is in front of the display and within the field of view of the camera. The display includes an imaging area and a compensation area, which preferably surrounds the imaging area in a certain embodiment but is not necessarily limited to that arrangement. The imaging area may also be referred to as the main area. Both the imaging area and the compensation area emit light that strikes the subject. The imaging area includes the main image (e.g., a video feed from a video conferencing session). The compensation area includes one or more colors selected based on the one or more colors in the imaging area (i.e., one or more colors in the main image). In accordance with one or more embodiments, the light emitted from the compensation area is chosen to compensate the color of the light emitted by the imaging area, thereby resulting in a combined light being emitted by the display that is substantially achromatic (i.e., white or gray) as a whole. This white or gray light strikes the subject (i.e., the subject is lit by the white or gray light) and improves the quality of the image captured by the camera. Accordingly, in the case of a teleconference, the image of the subject, as captured by the camera, will be improved as viewed by the other party in the video conference. The display may be any type of display that is used in a video conferencing system, e.g., the display may be a desktop computer monitor, the display of a mobile device, such as a mobile phone or tablet computer, or a projector used for a business quality video conferencing system.

FIG. 1 shows a system (101) in accordance with one or more embodiments of the invention. More specifically, FIG. 1 shows a video conferencing system (101) that includes a display (103), a video camera (113), and optionally, a sensor (115). In accordance with one or more embodiments, the display (103) may be a desktop monitor display, a tablet computer display, a mobile phone display, e.g., the screen of a cell phone, smart phone, or the like, or any other display that is suitable for conducting a video conference. In addition, the video camera (113) may be a built-in video camera or stand-alone device without departing from the scope of the present disclosure. In accordance with one or more embodiments, a subject (105) may conduct a video conference with a displayed party (117a), the image of which, in part, forms the main image (117) that is displayed in the imaging area (107). In accordance with one or more embodiments, the main image (117) is formed from the pixels that make up the display (103). Furthermore, as described in more detail below, the imaging area (107) may be divided into sub-areas, also referred to as zones, with each sub-area or zone including one or more pixels. As used herein, the pixels of the display (103) that form the imaging area are called the image pixels. The pixels of the display (103) that are used to form the compensation area are called compensation pixels. In this disclosure, a pixel is the minimum display unit that can reproduce multiple chromatic and achromatic colors. Therefore, in case the display employs an additive color system and has red, green, and blue filtered display elements, one set of the red, green, and blue elements may constitute one pixel.

In accordance with one or more embodiments, the image pixels forming the main image (117) may generate illumination (119) whose color depends on content of the main image (117). For example, if displayed party (117a) is wearing a red shirt, then the illumination (119) will be dominated by a red color. As a result of this red-dominated illumination the subject (105) may appear with a red tint in an image captured by the camera (113) and viewed by the displayed party (117a).

In accordance with one or more embodiments, the display (103) also includes a compensation area (109) that includes compensation pixels (not shown). Furthermore, as described in more detail below, the compensation area (109) may be divided into sub-areas, also referred to as zones, with each sub-area or zone including one or more pixels. Compensation area (109) generates illumination (121) whose color is set based on the opponent color (or complementary color) of the illumination (119). For example, using the example laid out above for a displayed party (117a) wearing a red shirt, one or more compensation pixels of the compensation area (109) may display green and/or cyan compensation illumination. In this way, the compensation illumination (121) may be used to improve the color of the subject (105) in any image captured by the camera (113) and viewed by the displayed party (117a) or any other party.

In accordance with one or more embodiments, the display (103) may also include an ambient light sensor (115) for sensing the ambient illumination (123) in the environment (e.g., room) where the subject (105) is located. This ambient light information (e.g., the color temperature, luminance) may be used to adjust the illumination from the compensation area (109). For example, the color of the compensation area (109) may depend on the color of the main image (117) and also may depend on the color temperature of the ambient illumination (123). In this way, the compensation area (109) may be used to compensate for both the color of illumination (119) and may also compensate the color temperature of the illumination (119) so as to match the color temperature of the ambient light illumination (123). For example, by matching the color temperature of the ambient light illumination (123), the image of the subject (105) captured by the camera (113) may be more accurately reproduced on the display of the displayed party or any other party. Furthermore, the compensation area may compensate the overall color and color temperature of the illumination (119) to be more visually pleasing to the subject (105) and/or the displayed party (117a), or any other party viewing images of the subject (105) captured by the camera (113). In such cases, it is apparent that the light emitted from the compensation area may not necessarily be the opponent color of the illumination (119) generated from the main image (117).

Figure 2:
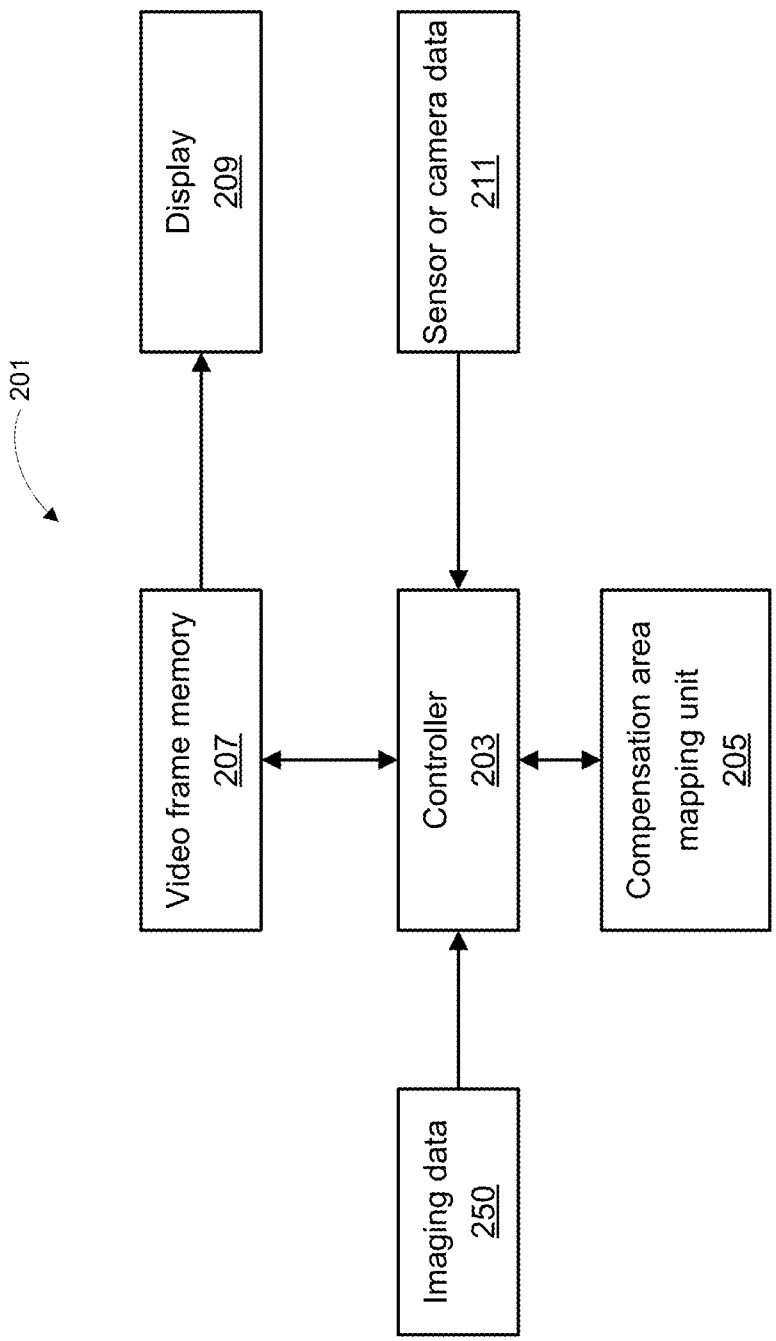
FIG. 2 shows a system in accordance with one or more embodiments of the invention.

FIG. 2 shows a system (201) in accordance with one or more embodiments of the invention. More specifically, FIG. 2 shows a block diagram of a system for display device illumination. The system includes a display device controller (203) configured to receive imaging data (250). In accordance with one or more embodiments, the imaging data (250) represents the data used to generate the main image and includes information relating to pixel location and pixel color value. The image data may be encoded or decoded and the device controller includes, if necessary, all of the required hardware for decoding an encoded stream of video data, as is known in the art.

Device controller (203) is also operatively connected to a compensation area mapping unit (205). For any given imaging pixel or zone (i.e., sub-area) in the imaging area, there may be a corresponding compensation pixel or zone in the compensation area. For example, the corresponding compensation pixel/zone may be the compensation pixel/zone closest to the imaging pixel/zone. In accordance with one or more embodiments, compensation mapping unit (205) includes information for associating, or mapping, a compensation sub-area or zone to a imaging sub-area or zone.

Figure 4:
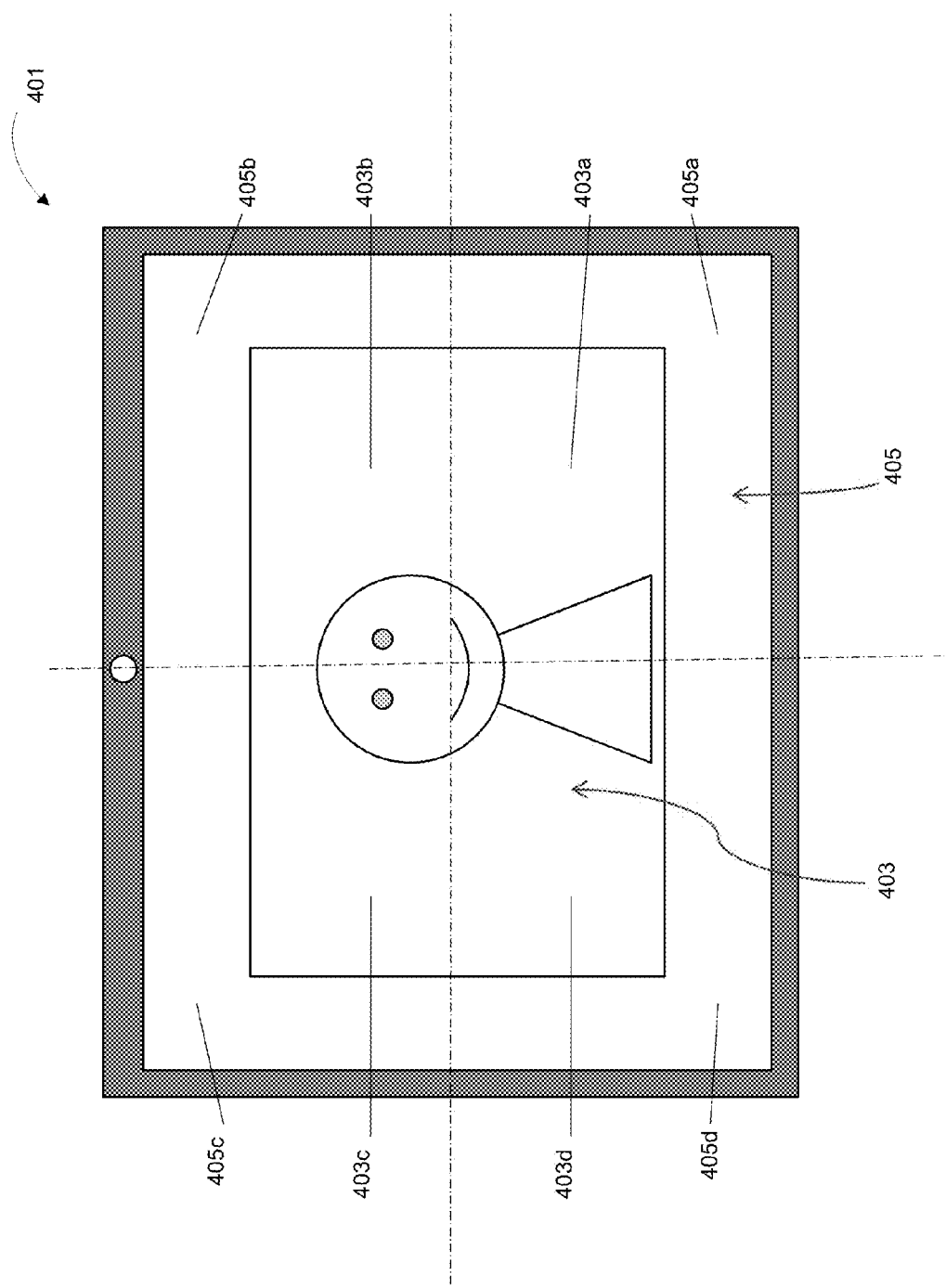
FIG. 4 shows a system in accordance with one or more embodiments of the invention.

In FIG. 4, the imaging area (403) is divided into four zones or imaging sub-areas (403a)-(403d). Likewise, the compensation area (405) is divided into four compensation zones or compensation sub-areas (405a)-(405d). In accordance with one or more embodiments, each imaging zone (403a)-(403d) has a corresponding compensation zone (405a)-(405d) associated with it. In this example, the association or mapping of imaging zone to compensation zone is accomplished using the distance between the zones. For example, for a given imaging zone, a corresponding compensation zone may be selected based on the smallest distance between the centers of the two shapes representing the zones. Other methods are also possible (e.g., using a fixed distance between the zones, random mappings, or any predetermined mapping between the two zones). Accordingly, the present disclosure is not limited to any given method for corresponding compensation zones to image zones.

In accordance with one or more embodiments, the compensation area mapping unit (205) may include a lookup table (LUT) stored in a memory. The LUT may define, for each imaging sub-area, the position or identity of the corresponding compensation sub-area on the display. In accordance with one or more embodiments, the mapping between imaging sub-area and compensation sub-area may be 1:1 (one imaging sub-area corresponds to only one other compensation sub-area), many-to-one (more than one imaging sub-area correspond to the same compensation sub-area), one-to-many (one imaging sub-area corresponds to multiple compensation sub-areas), or many-to-many (multiple imaging sub-areas corresponds to multiple compensation sub-areas).

The controller (203) also includes a processor that determines the color of a compensation sub-area based on the opponent color of a corresponding imaging sub-area. As described above, the sub-area may be a single pixel or group of pixels. In the example that follows, a sub-area using a single pixel is used for simplicity, but the present disclosure need not be so limited. For example, a sub-area may include a group of imaging pixels and may likewise correspond to a group of compensation pixels, and the color of the group of compensation pixels may be determined based on the average color of the main image pixels in the corresponding imaging sub-area. Returning to the single pixel case, the color value of a compensation pixel I' may be determined based on a color value of a corresponding main image pixel I by the following equation $$I'_i = 255 \cdot \left(1 - \left(\frac{I_i}{255}\right)^{2.2}\right)^{1/2.2} \quad (1)$$

where I is the color value, e.g., in an 8-bit system, I is a number ranging from 0-255, normalized to 255. The subscript i denotes the color of the pixel, e.g., red (i=r), green (i=g), or blue (i=b), for the case of an RGB color space. For example, in an 8-bit RGB color space and when the imaging pixel value is given by (R,G,B)=(160,130,100), the digital count, or color value of the corresponding compensation pixel is given by $$I'_r = 255 \cdot (1-(160/255)^{2.2})^{1/2.2} = 208$$

$$I'_g = 255 \cdot (1-(130/255)^{2.2})^{1/2.2} = 226$$

$$I'_b = 255 \cdot (1-(100/255)^{2.2})^{1/2.2} = 239$$

Figure 5:
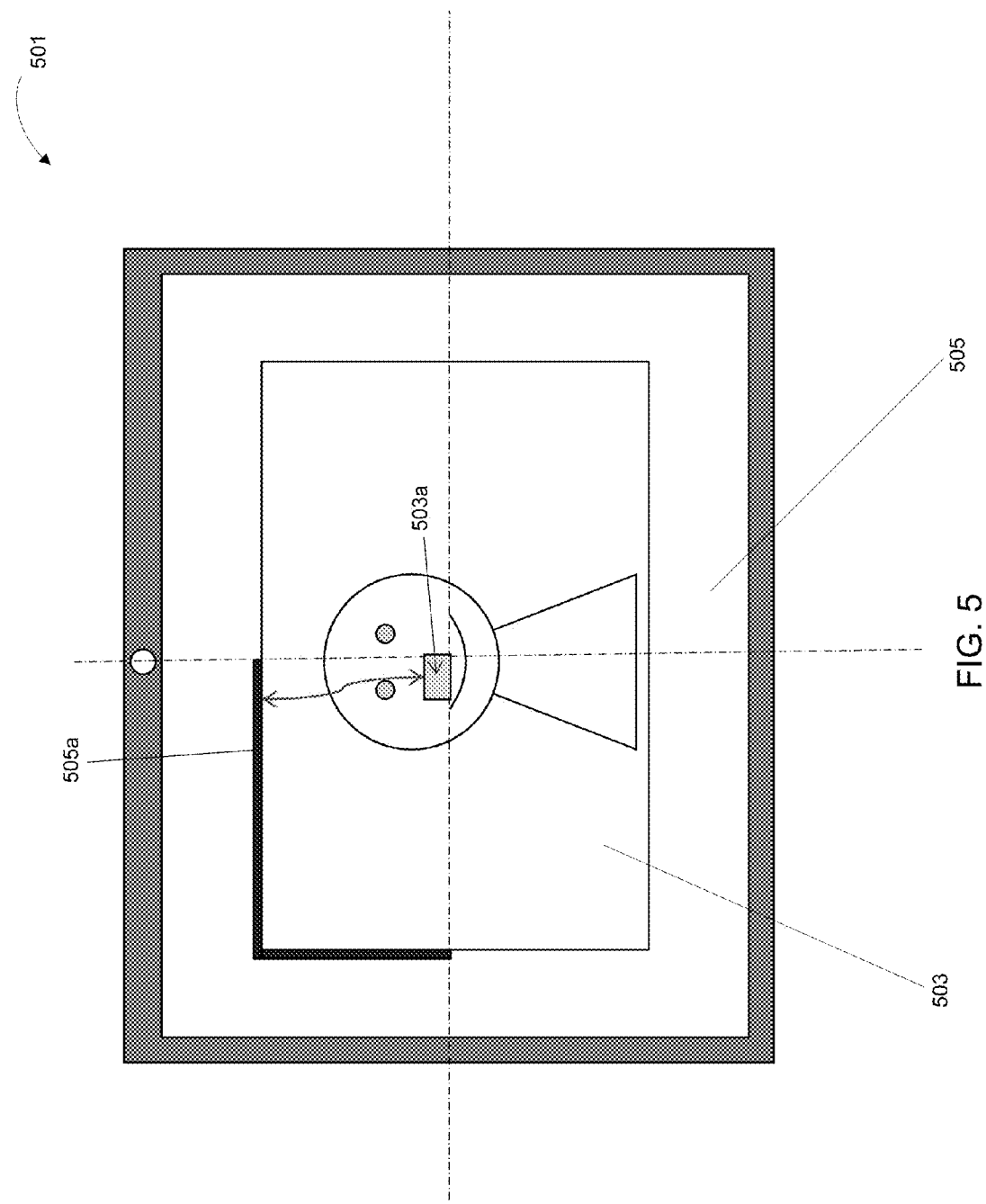
FIG. 5 shows a system in accordance with one or more embodiments of the invention.

Other equations for determining the color value of the compensation pixel may be used without departing from the scope of the present disclosure and, thus, the present disclosure should not be limited to compensation based only on the equations laid out above. For example, rather than using a single pixel color value, the average of a larger sub-area may be used. In this case, the equation would take the form $$\langle I'_i \rangle = 255 \cdot \left(1 - \left\langle \left(\frac{I_i}{255}\right)^{2.2}\right\rangle\right)^{1/2.2}$$

where $\langle I_i^{2.2} \rangle$ is the average color value of several pixels from the sub-area within the imaging area (e.g., sub-area 503*a*, shown in FIG. 5). In addition, other color spaces may also be used without departing from the scope of the present disclosure.

Returning to FIG. 2, the controller (203) determines the compensation color value for every pixel of the compensation area and builds a video frame based on the imaging data and the compensation data. The video frame, which now includes not only the imaging data but also the compensation data are stored in the video frame memory (207), that may be, e.g., a video frame buffer. The frames are then output to the display (209).

The system (201) may also include an optional sensor (211) for sensing the ambient light within the environment which includes the subject (i.e., the light that illuminates the subject when the display is turned off). The sensor (211) may be the camera that is used for the video conference. In other embodiments, an additional sensor may be used that first diffuses the light before sensing. In both cases, the sensor may provide ambient light information to the controller (203). The controller may then determine a number of qualities of the ambient light, e.g., the color temperature of the ambient light and modify the compensation color value determination based on the quality of the ambient light. In one example, the controller may determine a color temperature compensation value for one or more pixels designated on the display as color temperature compensation pixels. These color temperature compensation pixels may be part of a color temperature compensation area (e.g., color temperature compensation area 607, shown in FIG. 6).

Figure 3:
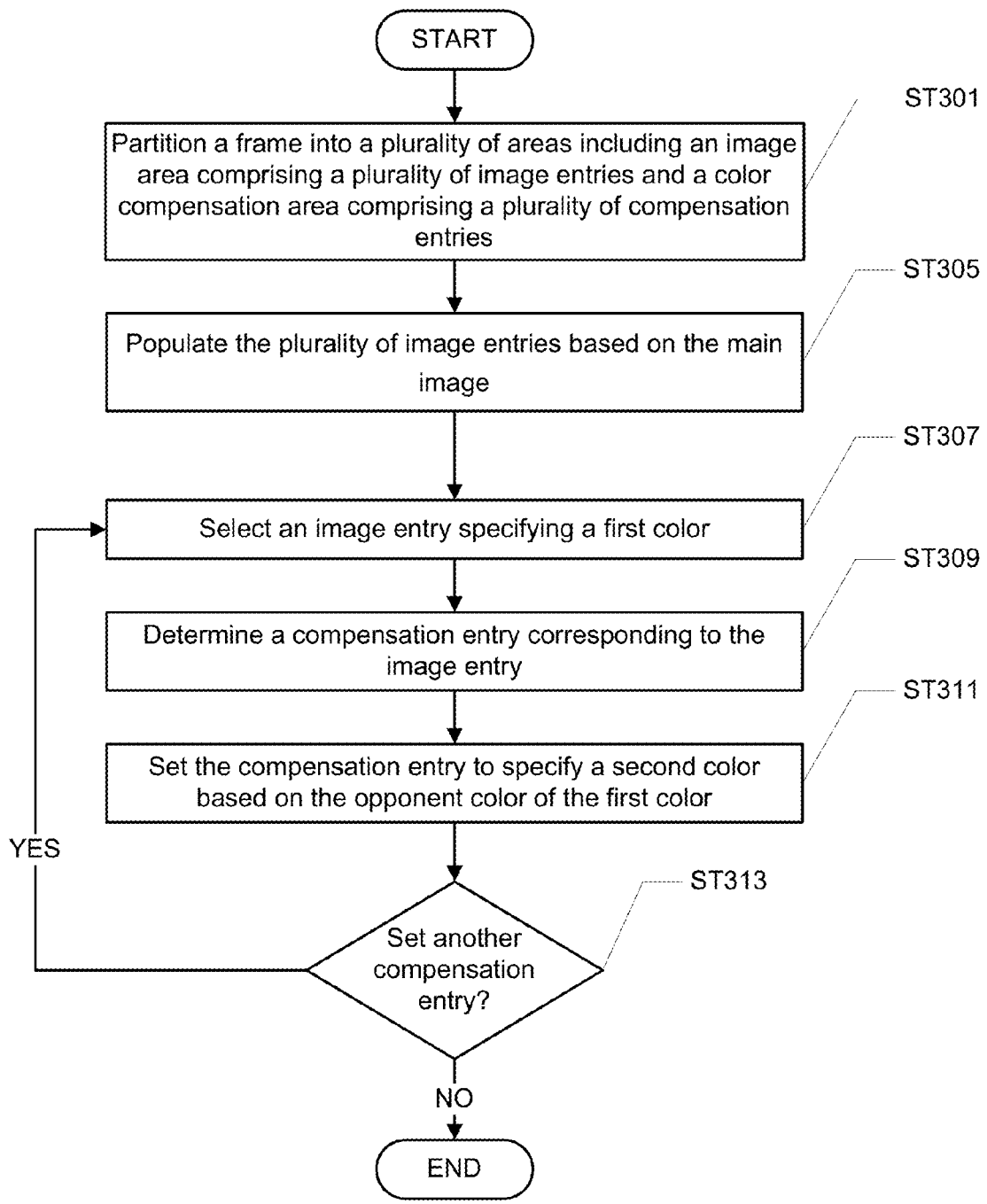
FIG. 3 shows a flowchart in accordance with one or more embodiments of the invention.

FIG. 3 shows a flowchart for a method of generating compensated video frame data in accordance with one or more embodiments of the invention. In accordance with one or more embodiments, the method may be stored on computer readable memory and be in the form of computer readable instructions that when executed by the processor of the controller (203) cause the processor to execute the method. In STEP 301 a video frame is partitioned into two or more areas including an imaging area and a color compensation area(s). As used herein, a video frame is a data structure comprising multiple entries, and each entry corresponds to one or more pixels on the display device. Accordingly, partitioning the video frame includes designating a set of entries for the imaging area (i.e., image entries) and designating a set of entries for the compensation area(s) (i.e., compensation entries). There may be multiple compensation entries for a single compensation area. For example, the number of image entries (i.e., cardinality of image entries) may equal the cardinality of compensation entries. As another example, the cardinality of image entries may correspond to ⅔ of the total entries in the video frame. The remaining ⅓ of the total entries (or a potion of the ⅓) may be compensation entries.

In STEP 305, the image entries are populated based on the main image.

For example, each image entry corresponds to a point or area of the main image and the color values of the image entries are set to values that facilitate accurate reproduction (in terms of color reproduction) of the main image on the display device during the video conference.

In STEP 307, an image entry is selected. As described above, the image entry, in part, includes a color associated with that image entry and a spatial position, e.g., (x,y) coordinate of that entry. In STEP 309, the compensation entry that corresponds to the selected image entry is determined. As described above, in reference to FIGS. 2-3, a compensation entry that corresponds to the image entry may be determined by reading a LUT that stores a predetermined mapping or correspondence between compensation entries and image entries.

In STEP 311, the determined compensation entry is set/populated based on the opponent color of the corresponding image entry. For example, the color of the compensation entry may be set using Equation (1). In one or more embodiments of the invention, the compensation entry corresponds to multiple image entries in the video frame. In such embodiments, the average color value for the multiple image entries including the selected image entry is calculated, and the color value of the compensation entry is set based on an opponent color of the average color. Those skilled in the art, having the benefit of this detailed description, will appreciate that as the average color value is calculated from the color value specified in the selected image entry, the opponent color (of the average color) is associated with the color value specified in the selected image entry. In case each compensation entry include multiple pixels, these individual pixels may display different colors each other as far as the compensation area can reproduce the opponent color as a whole. Yet in another embodiment, the color of the compensation entry may be determined based not only on the opponent color but also the color temperature of the ambient illumination (123), as explained above. In STEP 313, a check is made to verify if all of the compensation entries have been set. If another compensation entry needs to be set, the method returns to STEP 307. If all compensation entries have been set, the method ends and the video frame may be output for display on the display device.

FIG. 5 shows a system (501) in accordance with one or more embodiments of the invention. More specifically, FIG. 5 shows a display device that includes imaging area (503) and compensation area (505). In this example, the main imaging area is partitioned into one or more imaging sub-areas or zones (503a) that are each associated with a corresponding compensation zone or sub-area or zone (505a). In the example shown in FIG. 5, the correspondence between the compensation zone (505a) and the image zone (503a) is based on the minimum distance between the two zones. In other words, the compensation zone (505) is constructed from the compensation pixels that are closest to the image zone (503a). There is no need for the compensation zone (505a) to be the same shape as the imaging zone (503a) (i.e., the imaging zone (503a) and the compensation zone (505a) may have the same shapes or may have different shapes).

Figure 6:
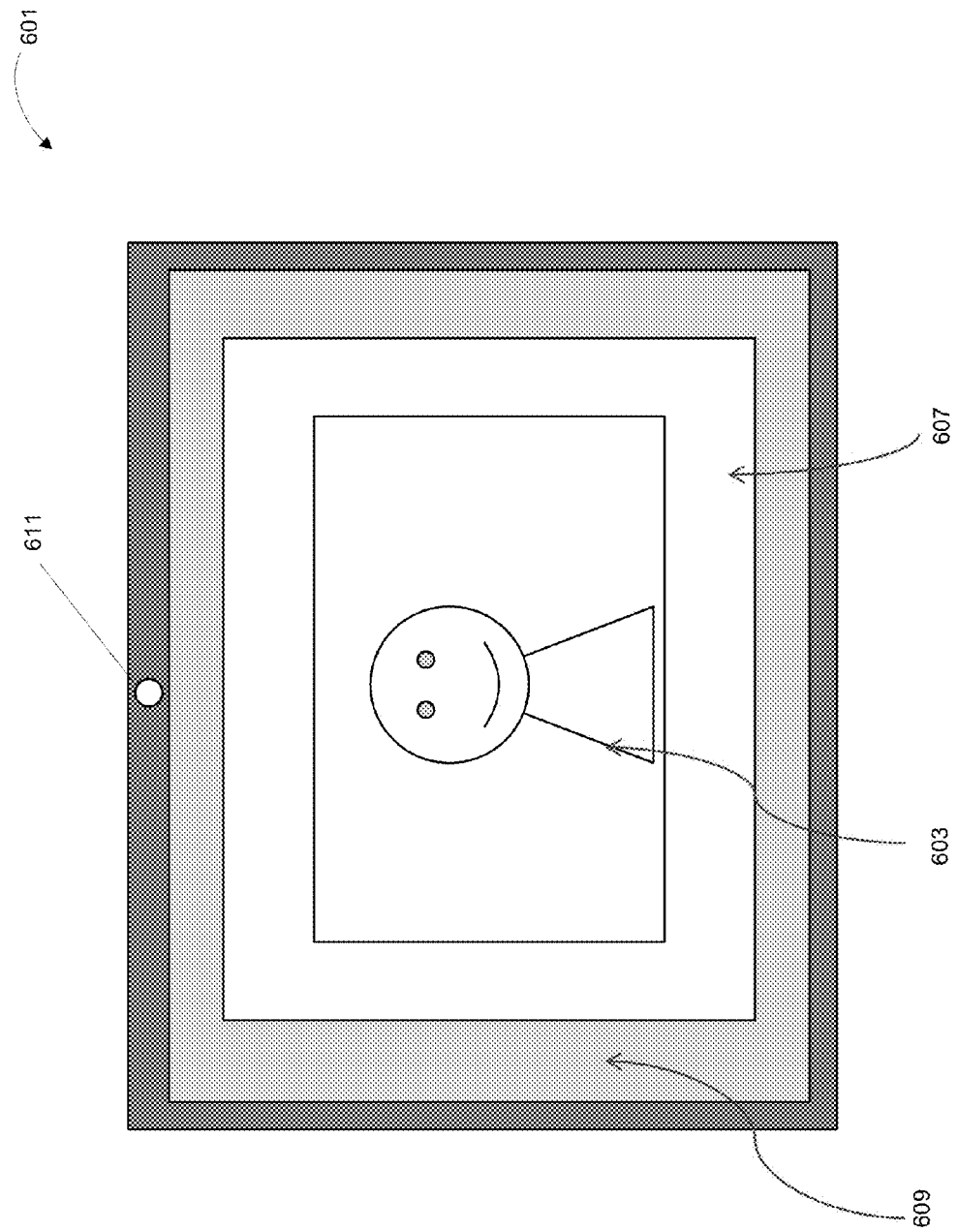
FIG. 6 shows a system in accordance with one or more embodiments of the invention.

FIG. 6 shows a system (601) in accordance with one or more embodiments of the invention. More specifically, FIG. 6 shows a display device that is partitioned into an imaging area (603) and a compensation area that is further partitioned into a color compensation area (607) and a color temperature compensation area (609). In this example, the imaging area (603) is about ⅓ of the total area of the display device, the color compensation area (607) is about ⅓ of the total area of the display device, and the color temperature compensation area (609) is about ⅓ of the total area of the display device. However, the ratios of these areas may be arbitrary without departing from the scope of the present disclosure. In accordance with one or more embodiments, the color temperature compensation area (609) may be used to give additional illumination to light up the subject. Furthermore the color temperature compensation area (609) may be used to adjust the average color temperature of the illumination based on the sensed ambient light color temperature. In many cases, the white point of image displays is higher than ambient light. One or more embodiments of the invention can compensate the color temperature difference between the ambient light and the display light. While FIG. 6 shows the color compensation area (607) and the color temperature compensation area (609) as separate and distinct areas on the display device, they may be integrated into a single color compensation area without departing from the scope of the present disclosure.

If used within rooms that are dark, i.e., low or no ambient light absent the display illumination, the color temperature of the display device may be set by the user, e.g., 5000 K may be used because human feels that the color temperature is "white." Further, if the amount of ambient light then changes, the color temperature of the display may be adjusted using the color temperature compensation area. In accordance with one or more embodiments, sensor (611) obtains diffused ambient light, but a similar output can be calculated by a camera (by averaging or by taking a region of the image in the background). If the camera has fish eye or very wide angle, the brightest point located at the upper side can be used for color temperature of ambient light (because it is likely to be a light source, for example).

The following is one example for calculating color temperature compensation. Referring to FIG. 6, assume the total area of the imaging area (603) and the color compensation area (607) is "a", and the area of color temperature compensation area (609) is "b"

Step 1: Calculate average R, G, and B values of the imaging area (603) and color compensation area (607) by averaging all pixel values in these areas (603, 607)

Step 2: Calculate target Rt, Gt, Bt to create the color temperature of ambient light. These values will be provided by sensor (115) or camera (113).

Step 3: Suppose the average R, G, and B values of color temperature compensation area (609) are Rc, Gc, and Bc.

$$R_t = k \cdot (a \cdot R + b \cdot R_c)$$

$$G_t = k \cdot (a \cdot G + b \cdot G_c)$$

$$B_t = k \cdot (a \cdot B + b \cdot B_c)$$

By solving the equations, $$R_c = \frac{\left(\frac{R_t}{k} + a \cdot R\right)}{b}$$

$$G_c = \frac{\left(\frac{G_t}{k} + a \cdot G\right)}{b}$$

$$B_c = \frac{\left(\frac{B_t}{k} + a \cdot B\right)}{b}$$

Where, k is an arbitrary coefficient which keeps Rc, Gc and Bc positive. Preferably bigger k is better. As a result, either Rc, Gc, and Bc may be zero. In some cases, Rc, Gc, and Bc may not fall into the signal range. In such a case, simple clipping or replacing the target Rt, Gt, and Bt with:

$$R'_t = w \cdot R_t + (1-w) \cdot R$$

$$G'_t = w \cdot G_t + (1-w) \cdot G$$

$$B'_t = w \cdot B_t + (1-w) \cdot B$$

Where "w" is an arbitrary coefficient between 0 and 1. Coefficient "w" may be found by iterative calculation. In the above calculations, all variables are linear $$\text{(e.g., } R = \left(\frac{R_i}{255}\right)^{2.2},$$

where Ri is 8-bit digital value).

Figure 7:
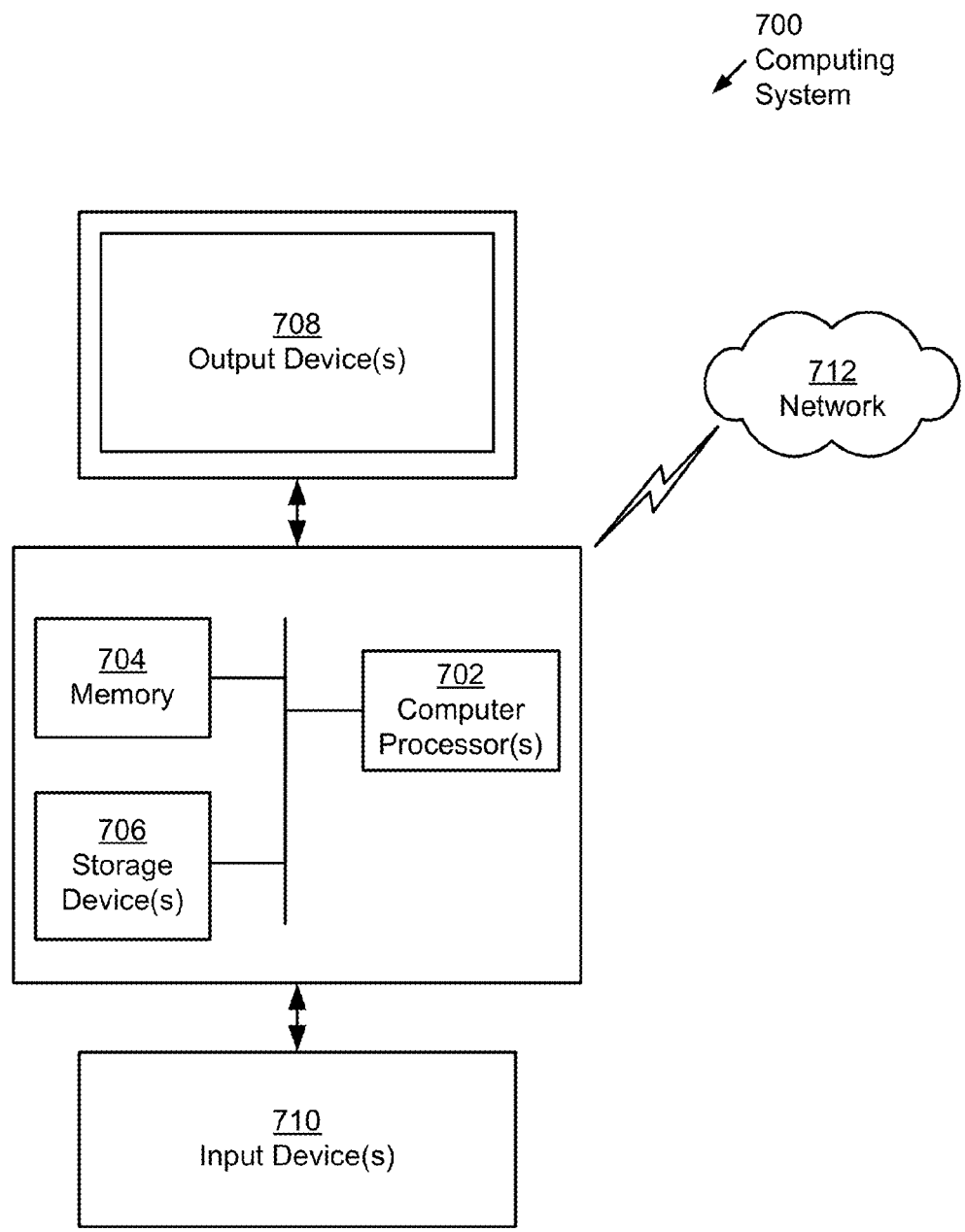
FIG. 7 shows a computer system in accordance with one or embodiments of the invention.

Embodiments of the invention may be implemented on virtually any type of computer regardless of the platform being used. For example, as shown in FIG. 7, a computer system (700) includes one or more processor(s) (702) (such as a central processing unit (CPU), integrated circuit, etc.), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). In accordance with one or more embodiments, the processor may be associated with the display device controller as described above in reference to FIG. 2. Furthermore, the storage devices (706) and memory (704) may be associated with the video frame buffer and/or compensation area mapping unit (205). For example, the memory (704) may be the video frame buffer and the storage devices (706) may store one or more look up tables for associating compensation zones with main image zones. The computer system (700) may also include input means, such as a keyboard (708), a mouse (710), a microphone (not shown), ambient light sensor (not shown), touch screen, and/or video camera (not shown). Further, the computer system (700) may include output means, such as a monitor, or display device (712) (e.g., a liquid crystal display LCD, a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention. Furthermore, the computer system (700) may be implemented as any known type of computing device, e.g., a desktop personal computer, tablet computing device, and/or a mobile computing device, such as a mobile phone.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a solid state memory device, a tape, memory, or any other non-transitory tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying a main image using a video frame comprising a plurality of image entries and a plurality of compensation entries, comprising:

populating the plurality of image entries in the video frame based on the main image, wherein the plurality of compensation entries is not used to display the main image;

selecting an image entry specifying a first color;

determining a compensation entry of the plurality of compensation entries in the video frame associated with the image entry;

selecting a second color based on the first color;

setting the compensation entry to the second color; and outputting the video frame comprising the image entry and the compensation entry for display on a display device, wherein the display device simultaneously displays an imaging area corresponding to the plurality of image entries and a compensation area corresponding to the plurality of compensation entries.

2. The method of claim 1, wherein the second color is an opponent color of the first color.

3. The method of claim 1, further comprising:

detecting a color temperature of ambient light in an environment comprising the display device, wherein selection of the second color is further based on the color temperature.

4. The method of claim 3, wherein the color temperature is 5000K.

5. The method of claim 1, further comprising:

partitioning the plurality of image entries into a plurality of imaging zones; and partitioning the plurality of compensation entries into a plurality of compensation zones, wherein the image entry is located within an imaging zone, and wherein the compensation entry is located within a compensation zone corresponding to the imaging zone.

6. The method of claim 5, wherein selecting the second color comprises:

calculating an average color value of a subset of the plurality of image entries within the imaging zone, wherein the second color is an opponent color of the average color value.

7. The method of claim 1, wherein the plurality of compensation entries surround the plurality of image entries in the video frame.

8. A method for displaying a main image on a display device comprising a plurality of image pixels and a plurality of compensation pixels, comprising:

setting an image pixel of the display device to a first color based on the main image, wherein the plurality of image pixels display the main image;

setting a compensation pixel of the display device corresponding to the image pixel to a second color based on an opponent color associated with the first color, wherein the plurality of compensation pixels is not used to display the main image; and simultaneously displaying by the display device, after setting the image pixel and the compensation pixel, an imaging area comprising the plurality of image pixels and a compensation area comprising the plurality of compensation pixels.

9. A non-transitory computer readable medium (CRM) storing instructions for displaying a main image using a video frame comprising a plurality of image entries and a plurality of compensation entries, the instructions comprising functionality for:

populating the plurality of image entries in the video frame based on the main image, wherein the plurality of compensation entries is not used to display the main image;

selecting an image entry specifying a first color;

determining a compensation entry of a plurality of compensation entries in the video frame associated with the image entry;
selecting a second color based on the first color;
setting the compensation entry to the second color; and
outputting the video frame comprising the image entry and the compensation entry for display on a display device,
wherein the display device simultaneously displays an imaging area corresponding to the plurality of image entries and a compensation area corresponding to the plurality of compensation entries.

10. The non-transitory CRM of claim 9, wherein the second color is an opponent color of the first color.

11. The non-transitory CRM of claim 9, the instructions further comprising functionality for:
detecting a color temperature of ambient light in an environment comprising the display device, wherein selecting the second color is further based on the color temperature.

12. The non-transitory CRM of claim 9, the instructions further comprising functionality for:
partitioning the plurality of image entries into a plurality of imaging zones; and
partitioning the plurality of compensation entries into a plurality of compensation zones,
wherein the image entry is located within an imaging zone, and
wherein the compensation entry is located within a compensation zone corresponding to the imaging zone.

13. The non-transitory CRM of claim 12, wherein the instructions for selecting the second color comprise functionality for:
calculating an average color value of a subset of the plurality of image entries within the imaging zone, wherein the second color is an opponent color of the average color value.
a display device that sets a plurality of image pixels based on the plurality of image entries and sets a plurality of compensation pixels based on the plurality of compensation entries.

14. An apparatus for displaying a main image, comprising:
a video frame comprising a plurality of image entries and a plurality of compensation entries;
a controller configured to:
populate the plurality of image entries based on the main image, wherein the plurality of compensation entries is not used to display the main image;
select an image entry specifying a first color;
determine a compensation entry associated with the image entry;
select a second color based on the first color; and
set the compensation entry to the second color; and
a display device that simultaneously displays an imaging area corresponding to the plurality of image entries and a compensation area corresponding to the plurality of compensation entries.

15. The apparatus of claim 14, wherein the second color is an opponent color of the first color.

16. The apparatus of claim 14, further comprising:
a sensor that detects a color temperature of ambient light in an environment comprising the display device, wherein the second color is further based on the color temperature.

17. The apparatus of claim 16, wherein the color temperature is 5000K.

18. The apparatus of claim 14, further comprising:
a compensation area mapping (CAM) unit storing a mapping between the image entry and the compensation entry, wherein the compensation entry is determined by accessing the CAM unit.

19. The apparatus of claim 14, wherein the plurality of compensation pixels surround the plurality of imaging pixels on the display device.

20. A display device for displaying a main image, comprising:
an imaging area comprising a plurality of image pixels for displaying the main image, the plurality of imaging area comprising an image pixel comprising a first color based on the main image; and
a compensation area comprising a plurality of compensation pixels, the plurality of compensation pixels comprising a compensation pixel corresponding to the image pixel and comprising a second color based on an opponent color associated with the first color,
wherein the plurality of compensation pixels is not used to display the main image, and
wherein the imaging area and the compensation area are simultaneously displayed.

21. The method of claim 1, further comprising:
capturing an image of a subject in front of the display device,
wherein illumination from the compensation area combines with illumination from the imaging area to generate substantially achromatic light that strikes the subject in the image; and
transmitting the image to another party engaged in a video conference with the subject.

22. The apparatus of claim 14, further comprising:
a video camera that captures an image of a subject in front of the display device,
wherein illumination from the compensation area combines with illumination from the imaging area to generate substantially achromatic light that strikes the subject in the image, and
wherein the image is transmitted to another party engaged in a video conference with the subject.

* * * * *